(12) United States Patent
Puck et al.

(10) Patent No.: US 9,957,854 B2
(45) Date of Patent: May 1, 2018

(54) VALVE FOR A VALVE DEVICE

(71) Applicant: Mahle International GmbH, Stuttgart (DE)

(72) Inventors: Alexander Puck, Esslingen (DE); Christoph Steinmetz, Ludwigsburg (DE)

(73) Assignee: Mahle International GmbH (DE)

( * ) Notice: Subject to any disclaimer, the term of this patent is extended or adjusted under 35 U.S.C. 154(b) by 506 days.

(21) Appl. No.: 14/546,361

(22) Filed: Nov. 18, 2014

(65) Prior Publication Data

US 2015/0136060 A1 May 21, 2015

(30) Foreign Application Priority Data

Nov. 19, 2013  (DE) .................. 10 2013 223 571

(51) Int. Cl.
  *F01L 3/20* (2006.01)
(52) U.S. Cl.
  CPC ........... *F01L 3/20* (2013.01); *Y10T 29/49298* (2015.01)
(58) Field of Classification Search
  CPC . F01L 3/20; F01L 3/04; F01L 2101/00; Y10T 29/49298; Y10T 29/49302; Y10T 29/49307; F16K 1/32; F16K 1/12
  USPC ...... 123/188.2, 188.3, 188.11; 251/318, 366, 251/368; 29/888.4, 888.42
  See application file for complete search history.

(56) References Cited

U.S. PATENT DOCUMENTS

| | | | | |
|---|---|---|---|---|
| 1,826,542 A | * | 10/1931 | Hervig ..................... | F01L 3/02 123/188.3 |
| 2,403,926 A | * | 7/1946 | Johnson .................... | F01L 3/04 123/188.3 |
| 2,426,438 A | * | 8/1947 | Depew ...................... | F02F 1/32 123/90.27 |
| 2,431,853 A | * | 12/1947 | Dolch, Jr. ................ | B21K 1/22 123/188.3 |
| 3,073,294 A | | 1/1963 | Brown et al. | |
| 3,227,544 A | * | 1/1966 | Rowady ............... | B23K 35/308 420/112 |
| 3,275,426 A | * | 9/1966 | Rowady .................... | C23C 4/04 419/12 |
| 4,515,343 A | * | 5/1985 | Pischinger ............... | F01L 1/16 123/90.11 |

(Continued)

FOREIGN PATENT DOCUMENTS

DE  2827271 A1  1/1979
DE  69208826 T2  10/1996

(Continued)

OTHER PUBLICATIONS

English abstract for JP-62-240408.

(Continued)

*Primary Examiner* — Grant Moubry

(74) *Attorney, Agent, or Firm* — Fishman Stewart PLLC

(57) ABSTRACT

A valve for a valve device may include a valve stem, which in an axial direction relative to a valve stem axis merges into a valve disc projecting from the valve stem radially. A valve cap may be included composed of a metal. The valve cap may be attached to an axial end portion of the valve stem facing away from the valve disc. The valve cap may cover a face end of the valve stem facing away from the valve disc and may envelope the axial end portion of the valve stem at least partially.

20 Claims, 1 Drawing Sheet

(56) References Cited

U.S. PATENT DOCUMENTS

| | | | | |
|---|---|---|---|---|
| 4,867,116 | A | * | 9/1989 | de Freitas Couto Rosa ............................. B32B 15/01 123/188.3 |
| 5,169,460 | A | * | 12/1992 | Mae ........................ C22C 14/00 123/188.3 |
| 8,234,788 | B2 | * | 8/2012 | Rozario .................. B22F 7/062 123/188.1 |
| 2002/0033465 | A1 | | 3/2002 | Mori et al. |
| 2014/0083382 | A1 | | 3/2014 | Flender et al. |

FOREIGN PATENT DOCUMENTS

| | | |
|---|---|---|
| DE | 102010034617 A1 | 2/2012 |
| EP | 0911493 A2 | 4/1999 |
| EP | 2713018 A1 | 4/2014 |
| JP | 62-240408 | 10/1987 |

OTHER PUBLICATIONS

Schaefer, Ralph et al., "Die Elektromagnestische Puls Technologies im industriellen Einsatz", www.pstproducts.com.
English abstract for DE-2827271.
English abstract for DE-102010034617.
English abstract for DE-69208826.

* cited by examiner

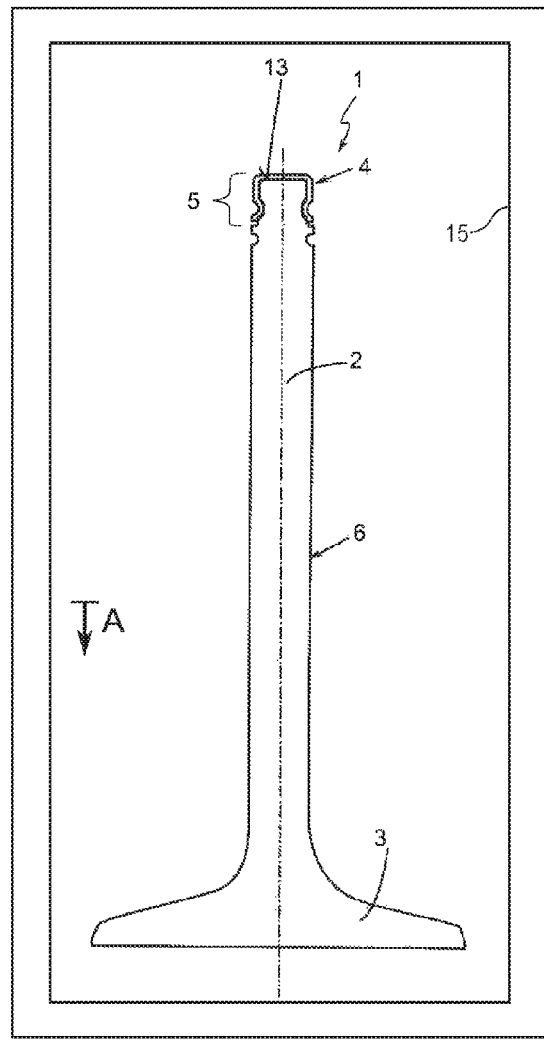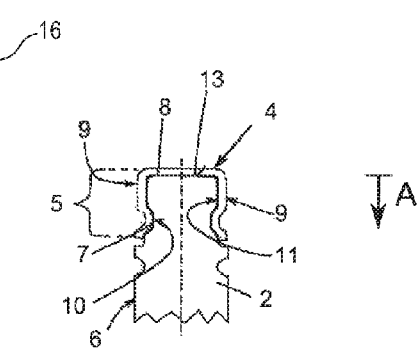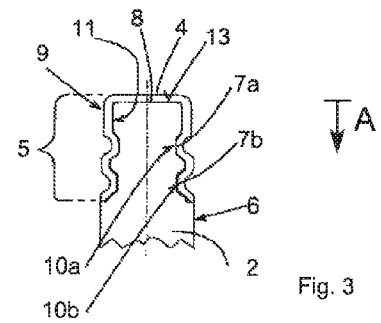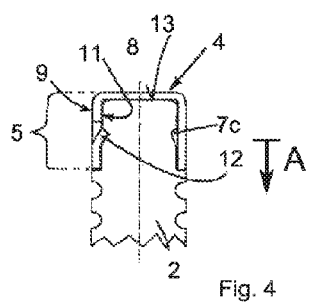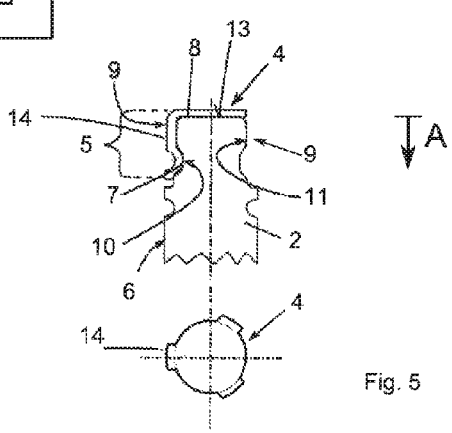

VALVE FOR A VALVE DEVICE

CROSS-REFERENCE TO RELATED APPLICATIONS

This application claims priority to German Patent Application No. 10 2013 223 571.2, filed Nov. 19, 2013, the contents of which are hereby incorporated by reference in their entirety.

TECHNICAL FIELD

The invention relates to a valve and to an internal combustion engine having such a valve. The invention also relates to a motor vehicle having such an internal combustion engine and to a method for producing such a valve.

BACKGROUND

Inlet valves of internal combustion engines make possible introducing air or an air-fuel mixture into the combustion chamber of the internal combustion engine and are exposed to equally high thermal and also mechanical loads during the operation of the internal combustion engine. Valve bodies of light-weight materials, such as are increasingly employed in modern, fuel-saving combustion engines are particularly susceptible to wear. Suitable materials for such weight-optimised valve bodies are for example aluminium or titanium, which however do not reach the strength of conventional valve bodies, for example of steel. In this respect, inlet valves with valve bodies of light metal frequently have the problem of a lifespan that is substantially reduced compared with conventional valves. The axial end of a valve stem of the valve body facing away from the valve disc is generally considered to be particularly susceptible to increased wear, which serves for mounting the entire valve body on the cylinder head of the internal combustion engine.

US 2002/033465 A1 attempts to counter this problem by attaching a valve cap of plastic at the axial end of a valve body formed by a shaped sheet metal part.

EP 0911 493 A2 describes a valve having a valve disc and a hollow-shaped valve stem, wherein on the latter a valve cap is welded onto the axial end.

SUMMARY

The invention now sets itself the object of creating a valve with increased wear resistance. A second object of the invention must be seen in providing an internal combustion engine having such a valve. A third object of the invention consists in providing a motor vehicle having such an internal combustion engine. Finally the invention sets itself the fourth object of stating a method for producing such a valve.

The mentioned objects are solved through the subject of the independent patent claims. Preferred embodiments are subject of the dependent patent claims.

Accordingly, the basic idea of the invention is to provide a valve with a valve stem, which in an axial direction merges into a valve disc radially projecting from the valve stem towards the outside, with a valve cap of a metal attached to the valve stem on the axial end, namely in such a manner that the same at least partially envelopes the axial end portion of the valve stem located opposite the valve disc and in the process covers the face end of the valve stem facing away from the valve disc. A cap formed in this way follows the operating principle of a protective cap which is able to protect the regions of the valve stem that are exposed during operation to major thermal and mechanical loads to a particular degree from excessive wear. In order to prevent that the valve stem on applying the valve cap is deformed in an undesirable manner the same can be formed at least in the region of the valve cap free of a hollow space, i.e. solidly.

Particularly sound protection from wear is achieved when the valve cap completely envelopes the axial end portion.

For durable protection from wear it is necessary to fasten said protective cap on the valve stem in a mechanically highly stable manner. For this purpose it is advisable to configure the valve cap and the axial end portion of the valve stem concerned in such a manner that a clip connection is formed. Such a clip connection allows producing the valve cap advantageously in terms of production in that its geometrical shape is created through a plastic forming process directly on the valve stem. To this end it is conceivable to utilise a sheet metal part as original component from which through plastic rolling on the axial end portion of the valve stem the desired valve cap is produced in a simple process step.

A particularly advantageous joining connection is obtained when the valve cap is re-formed through an electromagnetic pulse method so that a clip connection directly on the component is obtained between cap and valve stem. Such a clip connection can be produced particularly cost-effectively. During the electromagnetic pulse method, electromagnetic effects are utilised in order to generate a pulse-like forming force for a short period of time which plastically forms the middle of the valve cap in a durable manner, thus creating a fixed connection with the valve stem. By means of the electromagnetic pulse method, at least local welding of the valve cap to the stem end can be achieved and a particularly strong and advantageous joint connection be produced. By means of such a joining method, steel and light-metal materials can also be connected to one another which can otherwise be welded together only with difficulty.

A particularly efficient clip connection is obtained when on a lateral surface of the axial end portion at least one circumferential groove extending in circumferential direction is provided, in which the valve cap can engage following its fitting onto the valve stem. With respect to the concrete geometrical configuration of this circumferential groove there arise various options for the person skilled in the art for example realising a circumferential groove over the entire circumference or, alternatively to this, a circumferential groove which extends only in sections along the circumferential direction.

Particularly practical for engaging into a circumferential groove provided on the valve stem proves to be a cup-like design of the valve cap with a cup base and a cup wall integrally moulded on the latter. For forming said clip connection with the valve stem it is recommended in this case to provide an elevation on the valve stem that is formed complementarily to the circumferential groove, which engages into the at least one circumferential groove in a state of the valve cap in which it is mounted on the valve stem. This may be provided for example on an inside of the cup wall located radially inside and extend along the circumferential direction of the valve stem.

An advantageous further development of the clip connection, which makes possible particularly stable fixing of the valve cap on the valve stem, can be realised with the help of even two circumferential grooves which are arranged axially spaced from one another on the valve stem. Accordingly, two elevations which are complementary to the two circumferential grooves will then have to be provided on the valve cap.

The clip connection in this case can be embodied in such a manner that the end portion of the valve stem is completely enveloped by the valve cap or, alternatively to this, is realised in the form of at least three individual straps which only partly envelope said end portion. By using at least three individual straps the production of the clip connection can be substantially simplified. Compared with this, a completely enveloping clip connection allows a mechanically particularly stable fastening of the cap on the stem. This proves to be particularly advantageous when a roller tappet of a valve drive is to be laterally guided by the valve cap.

Alternatively or additionally it is possible to equip the valve cap with a fastening strap that radially projects to the inside from the inside of the cup wall, which can engage into a receiving groove provided on the lateral surface of the valve stem.

A particularly light-weight construction as is desirable for use in particularly fuel-saving internal combustion engines is obtained when valve stem and valve disc are produced from aluminium, from titanium, from an aluminium alloy or from a titanium alloy.

High wear resistance for the valve cap is obtained accordingly when as metal for the valve cap a heat-treatable steel, in particular C45 or 42CrMo4, is selected.

The invention furthermore relates to a valve device, in particular a reciprocating piston valve with a valve seat and a valve that is adjustably mounted on the valve seat having one or multiple of the features mentioned above.

The invention also relates to an internal combustion engine having at least one such valve device.

The invention finally relates to a method for producing a valve having one or multiple of the features mentioned beforehand. According to the method, the valve cap is initially placed onto the end portion of the valve stem and subsequently formed by means of an electromagnetic pulse method in such a manner that on the inside of the cup wall at least one elevation is formed, which engages into a complementary circumferential groove provided on the valve stem.

Preferentially, the electromagnetic pulse method is applied in such a manner that welding between valve cap and lateral surface materializes at least partially.

Further important features and advantageous of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically:

FIG. 1 an example of a valve for a reciprocating piston valve in a longitudinal section, FIG. 2 a detail view of FIG. 1 in a cut-off top view, FIG. 3 a first version of the example of FIG. 1, FIG. 4 a second version of the example of FIG. 2, FIG. 5 a third version of the example of FIG. 1 in a cut-off top view.

DETAILED DESCRIPTION

FIG. 1 illustrates in a longitudinal section a valve 1, e.g., for a valve device 15 of an internal combustion engine 16, with a valve stem 2, which in an axial direction A merges into a valve disc 3 that projects from the valve stem 2 radially to the outside. On the valve stem 2, a valve cap 4 of a steel material such as for example C45, 42CrMo4 or a comparable heat-treatable steel is attached. Alternatively to this, another suitable metal can also be selected. The valve cap 4 envelopes an axial end portion 5 of the valve stem 2 located opposite the valve disc 3 and covers the face end 13 of the valve stem 2 facing away from the valve disc 3. The cap diameter of the valve cap 4 in this case can be optionally selected smaller or larger than the stem diameter of the valve stem 2. In particular, the stem diameter of the valve stem 2 can be reduced in the region of the axial end portion 5 by an amount which corresponds to a wall thickness of the cup wall 9 of the valve cap 4. The outside of the cup wall 9 in this case is aligned with the outside of the valve stem 2 in the axial region that is complementary to the axial end portion 5 of said valve stem 2.

FIG. 2 now shows a detail view of the valve stem 2 including the valve cap 4 in the region of the axial end portion 5. The valve cap 4 has a cup base 8, which in axial direction A merges into the cup wall 9 and acts on the axial end portion 5 of the valve stem 2 that is susceptible to wear to a particular degree in the manner of a protective cap.

A particularly light-weight construction such as is desirable for use in particularly fuel-saving combustion engines is obtained when valve stem 2 and valve disc 3 are at least partially produced from aluminium, from titanium, from an aluminium alloy or from a titanium alloy. Here, the valve stem can preferably contain the following materials: silicon with a volumetric component of 23% to 27%, iron with a volumetric component of 3% to 4%, nickel with a volumetric component of 2.5% to 3.5%, magnesium with a volumetric component of 0.3 to 0.7%, manganese with a volumetric component of 0.3 to 0.7%, titanium with a volumetric component of a maximum of 0.5%, zirconium with a volumetric component of a maximum of 0.5% and chromium with a volumetric component of a maximum of 0.5%. Aluminium is used for the remaining volumetric percentage component.

Particularly high wear resistance for the valve cap 4 by contrast is achieved when as metal of the valve cap 4, C45, 52CrMo4 or a comparable heat-treatable steel is selected.

In order to prevent that the valve stem 2 when applying the valve cap 4 is deformed in an undesirable manner the same can be preferentially formed free of hollow space at least in the region of the axial end portion 5, i.e. solidly.

The valve cap 4 and the axial end portion 5 are now configured in such a manner that the valve cap 4 by means of a clip connection can be fastened to the axial end portion 5 of the valve stem 2. Such a clip connection, in addition to durably fixing the valve cap 4 to the valve stem 2, also allows an advantageous production method of the valve cap 4 by plastically forming the valve cap 4 out of a blank, for example in the form of a sheet metal part, directly on the valve stem 2.

For forming said clip connection, a circumferential groove 7 extending on the lateral surface 6 of the axial end portion 5 in circumferential direction is provided, into which the valve cap 4 can engage after it has been slid on the valve stem 2. To this end, an elevation 10 that is configured complementarily to the circumferential groove 7 is provided on the inside 11 of the cup wall 9, which extends along the circumferential direction of the valve cap 4. Both the circumferential groove 7 and also the elevation 10 can each be provided over the full circumference or alternatively to this, only in sections along the circumferential direction.

FIG. 3 now illustrates a version of the clip connection which allows particularly stable fixing of the valve cap 4 on the valve stem 2. This is effected with the help of two circumferential grooves 7a, 7b which are arranged spaced on the valve stem 2 in axial direction, into which two elevations 10a, 10b likewise positioned axially spaced from one another and provided on the valve cap 4 engage. Obviously, the valve cap 4 shown in FIG. 2 with a single elevation 10 can also be combined with the valve stem 2 having two circumferential grooves 7a, 7b shown in FIG. 3.

FIG. 4 shows a version, in which the valve cap 4 is provided with a fastening strap 12 radially projecting to the inside from the inside 11 of the cup wall 9, which engages into a complementary receiving groove 7c provided on the lateral surface 6 of the valve stem 2.

FIG. 5 finally shows a version in which the valve cap 4 covers the face end 13 of the valve stem 2 facing away from the valve disc 3 and the end portion 5 is only partially enveloped by three fastening clips 14, which fix the valve cap 4 on the valve stem 2. Here, the fastening clips 14 each engage into a complementary receiving groove 7 provided on the valve stem 2, thus fixing the valve cap 4.

To produce the exemplary embodiments of a valve 1 according to the invention discussed above, a so-called electromagnetic pulse method can also be employed. During the course of this method, the valve cap 4 is initially placed onto the axial end portion 5 of the valve stem 2 and subsequently formed by means of an electromagnetic pulse method with which the person skilled in the art in the area of material science is familiar in such a manner that at least one elevation 10, 10a, 10b is formed, which engages into at least one circumferential groove 7, 7a, 7b provided on the valve stem 2.

Preferentially, the electromagnetic pulse method is applied in such a manner that welding between valve cap 4 and lateral surface of the valve stem 2 materializes at least partially.

The invention claimed is:

1. A valve for a valve device, comprising:
a valve stem merging into a valve disc in an axial direction of a valve stem axis, the valve disc projecting from the valve stem radially;
a valve cap composed of a metal attached to an axial end portion of the valve stem opposite the valve disc, the valve cap covering a face end of the valve stem facing away from the valve disc and at least partially envelopes a lateral surface of the axial end portion of the valve stem;
wherein the valve cap is secured to the axial end portion of the valve stem via a clip connection, and the valve cap is at least locally welded to the lateral surface of the axial end portion at a welded connection; and
wherein the clip connection includes at least one circumferential groove extending in a circumferential direction disposed on the lateral surface of the axial end portion, the at least one circumferential groove extending in sections and interrupted in the circumferential direction.

2. The valve according to claim 1, wherein the valve cap completely envelopes the axial end portion.

3. The valve according to claim 1, wherein the valve cap includes an axially extending cap wall and the clip connection includes at least one elevation extending radially from a radial inside of the cap wall, and wherein the welded connection is disposed in a region of the at least one elevation.

4. The valve according to claim 1, wherein:
the valve cap has a cup-like structure including a cup base and a cup wall integrally formed with the cup base; and
the cup wall on a radial inside includes at least one elevation extending in the circumferential direction disposed complementarily to the at least one circumferential groove provided on the axial end portion of the valve stem, wherein the at least one elevation in a state of the valve cap mounted on the valve stem engages in the at least one circumferential groove.

5. The valve according to claim 4, wherein at least one of the lateral surface of the valve stem includes two axially spaced circumferential grooves and the inside of the cup wall includes two axially spaced elevations.

6. The valve according to claim 4, wherein the valve cap includes a fastening strap radially projecting from the inside of the cup wall towards the lateral surface, the fastening strap interrupting the cup wall in the axial direction, and wherein the fastening strap engages into a receiving groove provided on the lateral surface of the valve stem.

7. The valve according to claim 1, wherein the valve stem and the valve disc are at least partially composed of at least one of aluminium, titanium, an aluminium alloy and a titanium alloy.

8. The valve according to claim 1, wherein the metal of the valve cap includes a heat-treatable steel.

9. The valve according to claim 1, wherein the lateral surface of the axial end portion includes a plurality of radial projections circumferentially spaced apart from one another and at least one receiving groove disposed in the circumferential direction between two of the plurality of radial projections, and wherein the valve cap includes at least one fastening clip engaging into the at least one receiving groove disposed circumferentially between said two of the plurality of radial projections.

10. The valve according to claim 1, wherein the valve stem is composed of a metal including the following materials:
silicon with a volumetric component of 23% to 27%;
nickel with a volumetric component of 2.5% to 3.5%;
magnesium with a volumetric component of 0.3% to 0.7%;
manganese with a volumetric component of 0.3% to 0.7%;
titanium with a volumetric component of up to 0.5%;
zirconium with a volumetric component of up to 0.5%;
chromium with a volumetric component of up to 0.5%; and
a remainder of aluminium.

11. An internal combustion engine, comprising: at least one valve, the at least one valve including:
a valve stem merging in an axial direction relative to a longitudinal valve stem axis into a valve disc projecting radially from the valve stem, the valve stem including an axial end portion opposite the valve disc, the axial end portion defining an axial face end and a lateral surface; and
a valve cap coupled to the axial end portion of the valve stem, the valve cap including a cup base covering the axial face end of the axial end portion and an cup wall extending axially towards the valve disc;

wherein the lateral surface includes at least one circumferential groove extending in a circumferential direction, and the cup wall on a radial inside includes at least one radially projecting elevation extending in the circumferential direction engaging into the at least one circumferential groove on the lateral surface; and wherein the cup wall further includes a fastening strap projecting radially from the radial inside towards the lateral surface of the axial end portion, the fastening strap interrupting the cup wall in the axial direction and engaging into a receiving groove disposed on the lateral surface.

12. The internal combustion engine according to claim 11, wherein the at least one circumferential groove extends entirely over a circumference of the lateral surface.

13. The internal combustion engine according to claim 11, wherein at least one of the at least one circumferential groove includes two grooves axially spaced from one another on the lateral surface of the end portion and the at least one elevation includes two elevations axially spaced from one another on the inside of the cup wall.

14. The internal combustion engine according to claim 11, wherein the lateral surface of the axial end portion includes a plurality of radial projections circumferentially spaced apart from one another and at least one receiving groove disposed in the circumferential direction between two of the plurality of radial projections, and wherein the cup wall of the valve cap includes at least one fastening clip engaging into the at least one receiving groove disposed circumferentially between said two of the plurality of radial projections.

15. The internal combustion engine according to claim 11, wherein the valve cap is at least locally welded to the lateral surface of the axial end portion at a welded connection.

16. The internal combustion engine according to claim 15, wherein the welded connection joining the valve cap to the lateral surface of the axial end portion is disposed in a region of the at least one elevation.

17. The internal combustion engine according to claim 11, wherein the at least one circumferential groove extends in sections along the lateral face and is interrupted in the circumferential direction.

18. A valve for a valve device, comprising:
a valve stem merging into a valve disc in an axial direction of a valve stem axis, the valve disc projecting from the valve stem radially;
a valve cap composed of a metal attached to an axial end portion of the valve stem opposite the valve disc, the valve cap covering a face end of the valve stem facing away from the valve disc and at least partially envelopes a lateral surface of the axial end portion of the valve stem;
wherein the valve cap is secured to the axial end portion of the valve stem via a clip connection, and the valve cap is at least locally welded to the lateral surface of the axial end portion at a welded connection; and
wherein the valve stem is composed of a metal including the following materials:
silicon with a volumetric component of 23% to 27%;
nickel with a volumetric component of 2.5% to 3.5%;
magnesium with a volumetric component of 0.3% to 0.7%;
manganese with a volumetric component of 0.3% to 0.7%;
titanium with a volumetric component of up to 0.5%;
zirconium with a volumetric component of up to 0.5%;
chromium with a volumetric component of up to 0.5%; and
a remainder of aluminium.

19. The valve according to claim 18, wherein the clip connection includes at least one circumferential groove extending in a circumferential direction disposed on the lateral surface of the axial end portion and at least one elevation extending radially from a radial inside of a wall of the valve cap, wherein the at least one elevation engages in the at least one circumferential groove.

20. The valve according to claim 18, wherein at least one of the valve cap completely envelopes the axial end portion and the metal of the valve cap is a heat-treatable steel.

* * * * *